(12) United States Patent
Choi

(10) Patent No.: US 7,778,267 B2
(45) Date of Patent: Aug. 17, 2010

(54) BUS SYSTEM

(75) Inventor: Hoon Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2698 days.

(21) Appl. No.: 10/059,813

(22) Filed: Jan. 29, 2002

(65) Prior Publication Data

US 2002/0150113 A1 Oct. 17, 2002

(30) Foreign Application Priority Data

Apr. 17, 2001 (KR) .............................. 2001-20385

(51) Int. Cl.
 *H04L 12/28* (2006.01)
(52) U.S. Cl. ..................... 370/423; 326/104
(58) Field of Classification Search ................ 370/423; 326/104; 710/100; 716/1, 2, 12, 16
See application file for complete search history.

(56) References Cited

U.S. PATENT DOCUMENTS

| | | | |
|---|---|---|---|
| 4,475,191 A * | 10/1984 | James et al. | ................ 370/458 |
| 5,590,316 A | 12/1996 | Hausauer | |
| 7,069,359 B1 * | 6/2006 | Nishimoto | ................ 710/100 |

FOREIGN PATENT DOCUMENTS

| JP | 06-231074 | 8/1994 |
|---|---|---|
| JP | 06-301643 | 10/1994 |

\* cited by examiner

*Primary Examiner*—Jayanti K Patel
*Assistant Examiner*—Jung Park
(74) *Attorney, Agent, or Firm*—F. Chau & Associates, LLC

(57) ABSTRACT

A bus system for providing a common data transmission path for N data sources that have M data bits. The N data sources are connected to M interconnections correspondingly through N bus cells each of which includes logic circuits for selectively providing the data bits of data sources into the interconnections. The bus cells are controlled to connect each of the data bits of the data sources to the selected one of the interconnections. The bus system is capable of adapting to delay times or loads of the data sources. The bus system reducing the number and the length of the interconnections.

8 Claims, 3 Drawing Sheets

BUS SYSTEM

RELATED APPLICATION

This application claims priority to Korean Patent Application No. 2001-20385, filed on Apr. 17, 2001, the contents of which are herein incorporated by reference in their entirety.

FIELD OF THE INVENTION

The present invention generally relates to distributed bus systems and, more specifically, to distributed bus systems adaptable to embedded system-on-a-chip (SOC).

BACKGROUND OF THE INVENTION

It is known in the art to employ a multiplicity of registers in a digital system. It is also known in the art to construct routes, in such a digital system for transferring data from one register to another register. A bus, which is an assemblage of common transmission lines controlled by switching circuits, has been utilized as a common route to efficiently perform data transmission between registers.

Recently, some bus architectures for embedded SOCs are changing to ones that basically are associated with at least one multiplexer (or MUX), i.e., MUX-based bus systems. Differences between the conventional tri-state bus systems and MUX-based bus systems architecture include such characteristics as ease for testing system performance. Automatic tools for electronic design, which establish test vectors, functionally tends to be more easily operable with the multiplexer-based buses rather than the tri-state buses. Furthermore, numerous electronic designs or designs tools are better suited for the MUX-based bus systems. In addition, it is more efficient to use MUX-based buses that are unidirectional, than other bus systems that are bi-directional, in order to enhance bus performance in chips.

However, many problems occur when the MUX-based buses are coupled to conventional MUX cells. Referring to FIG. 1, a conventional bus system associated with a multiplexer is depicted. A set of N signals is inputted into a centralized MUX 1. Each one of the N signals is composed of M bits. The set of N signals is applied to the centralized single MUX 1 from their respective data sources and then one of them is selected therefrom. This data source must provide all the interconnections that lead up to the MUX 1. Therefore, the total number of interconnections relating to the data source is M*N. For instance, when 32-bit buses are supplied from 11 data sources (a practical form in the design pattern of S3C2400X), all 352 (32*11) bits are involved in the MUX 1. Since a practical system employs numerous MUXs, the mutual interferences between the multiplicity of interconnections can cause increased signal delays.

Based upon usage and prior experiments, tri-state buses or wired-OR buses, which are used in large quantity in high-end processors, are regarded as insufficient for embedded systems such a SOC because of difficulties in testing.

As can be seen, there is a need for a bus system that is suitable for embedded systems with the bus system operating with relatively less interconnect. As well as a bus system that requires shortened interconnect lines.

SUMMARY OF THE INVENTION

It is, therefore, an object of the present invention to provide a bus system adaptable to an embedded system.

It is another object of the present invention to provide a bus system operable with less number of interconnections.

It is a further object of the present invention to provide a bus system operable with less length of interconnection lines.

According to an aspect of the present invention, there is a bus system providing a common data transmission path coupled to N (N denotes a positive integer) data sources that have M (M denotes a positive integer) data bits or less than M. The N data sources are connected to M-numbered interconnections correspondingly through N-numbered bus cells each of which includes logic circuits for selectively providing a path for the data bits of the data sources corresponding thereto into the interconnections. The bus cells are controlled to assist the data sources to offer their own data bits to the interconnections one by one.

Each of the bus cells includes M (or less than M) bit connection circuits, which couples data bits from the data sources to the interconnections. Each bit connection circuit includes an AND gate. The AND gate receives a data bit from a corresponding data source and then generates a logical output in response to a selection signal that determines a data source corresponding thereto. Each bit connection circuit further includes an OR gate. The OR gate receives the output of the AND gate and an output of a prior-stage bus cell, as well as generates a logical output as an output of the bus cell for the data bit.

When the number of the data sources connected to one bus cell is more than two, the bit connection circuit includes a plurality of AND gates each corresponding to its respective data source. Outputs from the plurality of AND gates are all applied to the OR gate.

Interconnection line reduction is accomplished by combining a plurality of groups of the M interconnections. For example, combining two groups of the interconnections make it possible to reduce the length to a half of its original length for the same number of the data sources. When the plurality of groups of the interconnections are connected to one bus through the AND gates, each AND gate corresponds to its respective data bit.

A data source in need of having a shorter delay time and/or a smaller load is preferably connected to a bus cell relatively adjacent or close to a data sink.

In accordance with the invention, a reduction of the number of interconnections is achieved. In other word, interconnection numbers are reduced to M from M*N. As can be appreciated, number M is smaller than the number of the centralized single MUXs and smaller than the tri-state buses. Such a decrease in the number of interconnections is desirous for shortening signal delay times that are due to mutual interferences. Furthermore, the decrease is desirous for a reduction of the area of a chip. Second, the instant invention increases signal propagation speed and lowers power consumption rate. Since buses of the instant invention transfer signals in one direction, it is sufficient just to consider only the loads along the direction, while the conventional tri-state buses conduct bi-directional signal transmission, which necessarily means that consideration of the entire loads over all of the buses is required. Therefore, the smaller load in transferring signals causes the lower power consumption. Third, operational timing is optimally controlled in a bus system of the invention. Since there are differences in delay times between the data sources in accordance with their connecting positions to buses, coupled with the condition of the unidirectional signal transmission, data sources with smaller delay times can be placed at positions closer to data sinks corresponding thereto. Forth, the present invention does not need additional buffers because the OR gate associated with the bus also performs the function carried out by the conventional buffers. This feature reduces delays through interconnections on buses.

The present invention will be better understood from the following detailed description of the exemplary embodiment thereof taken in conjunction with the accompanying drawings, and its scope will be pointed out in the appended claims.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF PREFERRED EMBODIMENTS

It should be understood that the description of the preferred embodiment is merely illustrative and that it should not be taken in a limiting sense. In the following detailed description, several specific details are set forth in order to provide a thorough understanding of the present invention. The term "interconnection" will be used to refer to a state or an electrical contact point to conduct signal transmission from a data source to a data sink through a bus.

Figure 1:
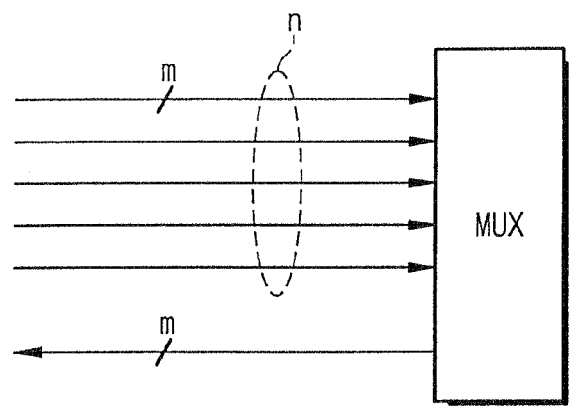
FIG. 1 depicts a conventional bus system basically associated with a multiplexer.
Figure 2:
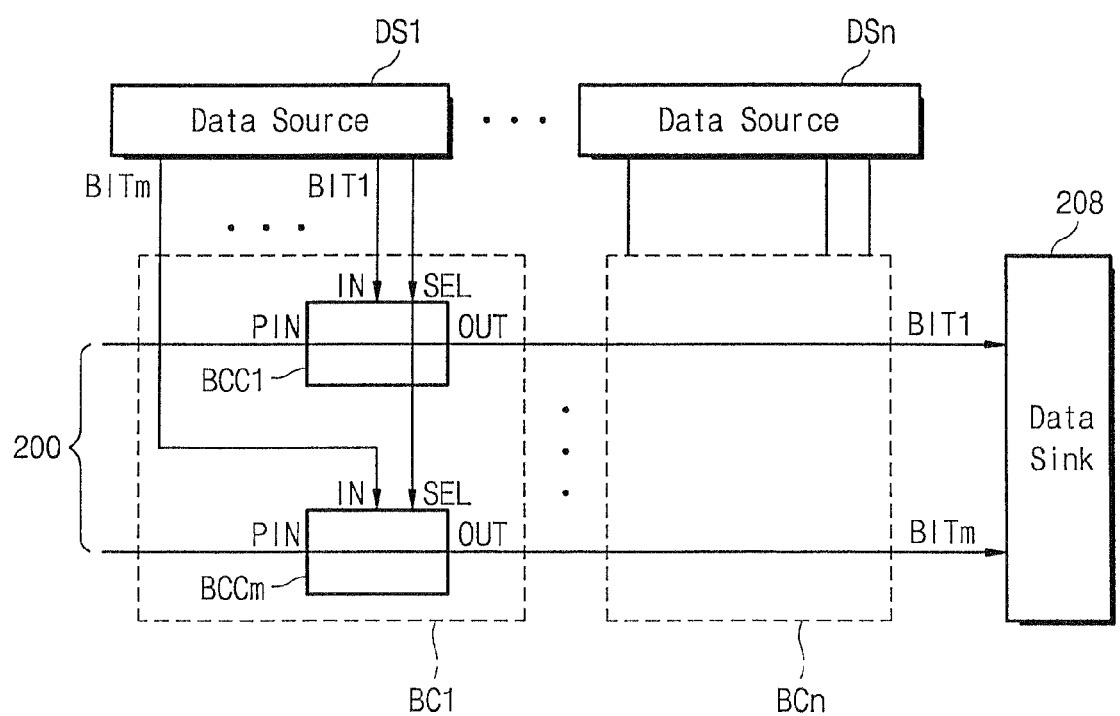
FIG. 2 depicts a distributed bus system according to a first embodiment of the invention.

FIG. 2 shows a construction of a distributed bus system according to a first embodiment of the invention, in which N data sources (DS1~DSn) each generating M data bits (BIT0~BITm) are connected to a bus 200. Bus cells BC1~BCn have the same number as that of data sources DS1~DSn. In other words, bus cells BC1-BCn and each has the same M-numbered bit connection circuit BCC1~BCCm (only BCC1 is indicated), where M corresponds to the number of the data bits. The reference numerals IN, SEL, PIN, and OUT denote an input of the data bit from the data source, a selection signal determining selection for the data source corresponding thereto, an output from a prestage bit connection circuit, and an output of the bit connection circuit, respectively. The data bits BIT1~BITm are coupled to the bit connection circuits BCC1~BCCm together with the outputs PINs from the pre-stage bit connection circuits. The selection signals SELs, being generated from a bus controller (not shown) in the digital system employing the bus system shown in FIG. 1, are alternatively conductive with a high level (i.e., logically "1") when an alternative one of the data sources is selected to load its data bit on the bus 200.

The bus cells BC1~BCn form a block chain (only BC1 and BCn are shown) that serially connects all the bus cells. The block chain offers a transmission path for data bits originating from some of the data sources DS1~DSn that are pre-selected. Each output OUT of the bit connection circuits BCC1~BCCm is provided as an input at the next-stage bit interconnection circuit that belongs to a subsequent bus cell and arranged on the same serial position.

It is preferable to arrange the data sources according to a rule in that those with smaller delay times are placed near the data sink 208 or the downstream segment of the block chain of the bus cells BC1~BCn. As can be appreciated, the more adjacent to the data sink 208 the data source is, the less number of gates the data bits pass and therefore the less time is needed for the data bit reach the data sink 208. Therefore, it can be understood that the data source DSn has data bits operable with the smallest delay times while the data source DS1 with the largest delay times. Additionally, as far as unidirectional transmission is concerned, it confronts only loads along the current transmission direction. Therefore, power consumption for transferring data bits (or signals) may be reduced, and propagation speed increased. As to loading effects, it is also preferable to place data sources with smaller loads at locations closer to the end of the block chain (or more adjacent to the data sink).

As shown in FIG. 2, it can be seen that the number of interconnections is M or I/N of the number of interconnections shown in FIG. 1, because the conventional MUX-based system (in FIG. 1) needs M*N interconnections. Similarly, for comparisons with tri-state bus systems, the same decrease in the number of interconnections may be achieved. Such a decrease in the number of interconnections causes a chip area for buses in an embedded SOC to be scaled down, mutual interferences to be reduced, and propagation times to be shortened.

Figure 3:
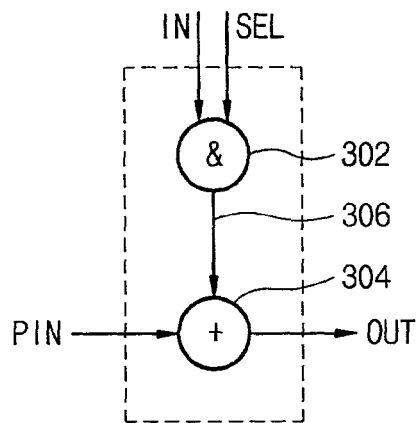
FIG. 3 depicts a bit connection circuit employed in the bus system shown in FIG. 2.

Referring to FIG. 3, an example of the bit connection circuits of any one of BCC1~BCCn is depicted. The bit connection circuit comprises one AND gate 302 and one OR gate 304. The AND gate 302 receives one of data bits provided from the data sources and the selection signal SEL, and in turn generates a logical output 306. The OR gate 304 receives the output 306 of the AND gate 302 and the output PIN of a pre-stage bit connection circuit (hereinafter, referred to as "pre-stage output") that is arranged at the same bit position, and then generates a logical output OUT from them. The output OUT from the OR gate 304 is applied to an OR gate of the next bit interconnection circuit belonging to the next bus cell.

The selection signal SEL is set on a logical value "1" when a current data source is selected. Thus, an output 306 of the AND gate 302 is dependent upon a data bit provided from the current data source selected at IN. If other data sources are not selected, PIN is "0" and output OUT of the OR gate 304 is subject to the current data bit. On the other hand, the selection signal SEL is set on "0" when a current data source is not selected. Thus, an output OUT of the OR gate 304 depends on the logical state of the pre-stage output PIN which corresponds to a data bit provided from a data source that has been selected. Hence, at this time, the OR gate 304 assigned to the non-selected data source at present outputs a data bit that is the same with the pre-stage output PIN, just passing it to the next stage therethrough. Such serial bit operations in the bit connection circuits are used for bussing the data bits to the data sink 208 from the data sources DS1~DSn.

As can be appreciated, in the instant invention described in the aforementioned relevant portion of the embodiment, data bits from the data sources are transferred along unidirectional paths through the logic gates in the bit connection circuits, in contrast to a tri-state bus system that uses bi-directional features. The unidirectional bus system of the present invention comprises bus cells that are constructed of logical circuits, having input and output terminals that are distinguishable from each other. In other word, the OR gate 304 receives a signal only at its exclusive OR input terminal and sends out a logical result output at its exclusive OR output terminal, whereby not permitting a bilateral signal transfer function to occur. Therefore, the unidirectional signal transmission system of the instant invention reduces the amount of load that is dominantly influenced by a single propagating direction over the bus system, thereby lowering power consumption.

Moreover, since the data bits are transferred through logic circuits such as OR gates, in which data bits are regenerated or re-amplified, there is no need for providing buffers on the interconnection chain.

It is noted that considering the fact that the more spaced from the data sink the bus cells are, the more the propagation times for data bits passing through the bus. This is because the data but must pass a greater number of logic gates. Further embodiments and modifications are described in FIGS. 4 through 6 and there respective descriptions.

Figure 4:
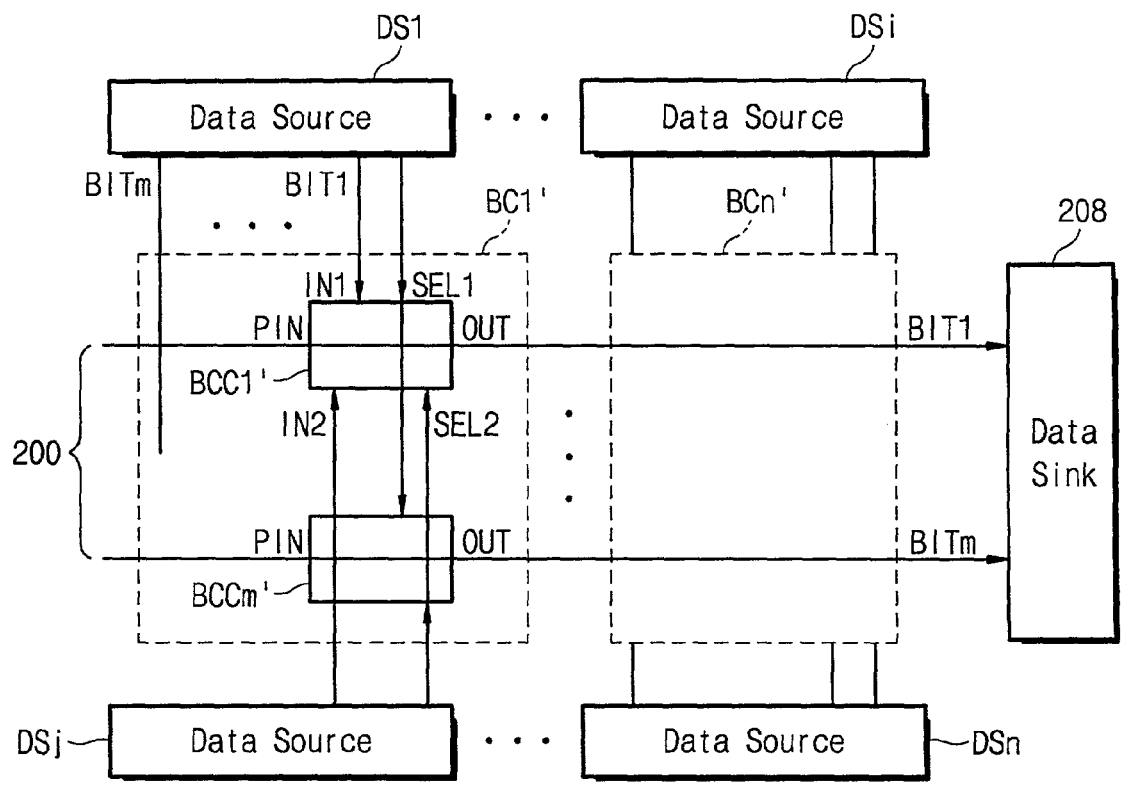
FIG. 4 depicts a distributed bus system according to a second embodiment of the invention.

FIG. 4 illustrates a distributed bus system according to a second embodiment of the present invention. Referring to FIG. 4, different from the feature of the first embodiment shown in FIG. 2, one bus cell (e.g., BC1') is connected to a pair of data sources (only two pairs shown, i.e., DS1 and DSj; DSi and DSn). Each of the bit interconnection circuits BCC1'~BCCm' receives two data bits IN1 and IN2 that are provided from the two data sources DS1 and DSj respectively, and two selection signals SEL1 and SEL2 are also provided from a single bus controller (not shown). IN1 and IN2 are data bits that are provided by the data sources DS1 and DSj, respectively. SEL1 and SEL2 are selection signals to determine selection for the data sources DS1 and DSj, respectively. PIN is an output provided from a prior-stage bit interconnection circuit that is arranged at the same bit location as that of OUT, which is an output of the bit connection circuit. When SEL1 is "1" and SEL2 is "0", the data bit IN1 is generated as an output signal OUT. While, when SEL1 is "0" and SEL2 is "1", the data bit IN2 is generated as an output signal OUT.

While the number of interconnections, or the block chain of serial-connected bus cells, is still M, which is the same as that of the data bits, the length of the block chain with the same number of the data sources DS1~DSn is reduced to a half of that shown in FIG. 2. Thus, the time passing through the bus 200 is one half of the time it takes in the first embodiment shown in FIG. 2.

Figure 5:
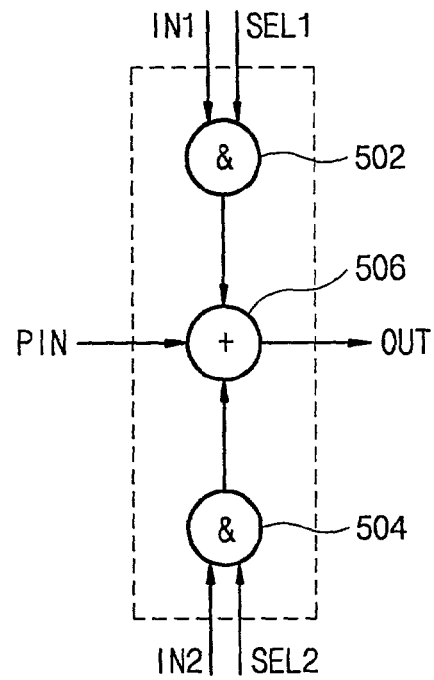
FIG. 5 depicts a bit connection circuit employed in the bus system shown in FIG. 4.

FIG. 5 shows an example of the bit connection circuits BCC1'~BCCm' employed in the bus system shown in FIG. 4. While the bit connection circuit employed in the first embodiment shown in FIG. 3 is formed of one AND gate and one OR gate, FIG. 5 comprises two AND gates 502 and 504 and one OR gate 506. And while the OR gate 304 of FIG. 3 receives two inputs, the OR gate 506 has three inputs.

Referring again to FIG. 5, the data bit IN1 and the selection signal SEL1 are applied to the AND gate 502, and the data bit IN2 and the selection signal SEL2 are applied to the AND gate 504. Outputs from the AND gates 502 and 504 and the prestage output PIN are applied to the OR gate 506.

If the data source DS1 of FIG. 4 is selected, it necessarily follows that SEL1 is set to "1", and SEL2 is set to "0" logically. Therefore, an output of the AND gate 502 is dependent on the data bits IN1 of the data source DS1, while an output of the AND gate 504 is "0", regardless of the data bit IN2 of the data source DSj. Thus, an output of the OR gate 506 is dependent on the output of the AND gate 502, because only data source DS1 is selected and thereby the pre-stage output PIN is also "0". In the same manner, if the data source DSj is selected, only SEL2 becomes "1". Thus, an output of the AND gate 504 determines an output of the OR gate 506 because PIN and an output of the AND gate 502 are all "0".

On the other hand, if both the data sources DS1 and DSj are not selected, SEL1 and SEL2 are all "0" and thereby outputs of the AND gates 502 and 504 are all set to "0". Therefore, an output of the OR gate 506, at this time, is dependent on the logic state of the pre-stage output PIN that, at least not DS1 or DSj, has been generated from any other data source selected. As a result, the block chain with serial-connected bus cells performs M-bit data transmission operations from a selected one of N-numbered data source to the data sink 208.

Figure 6:
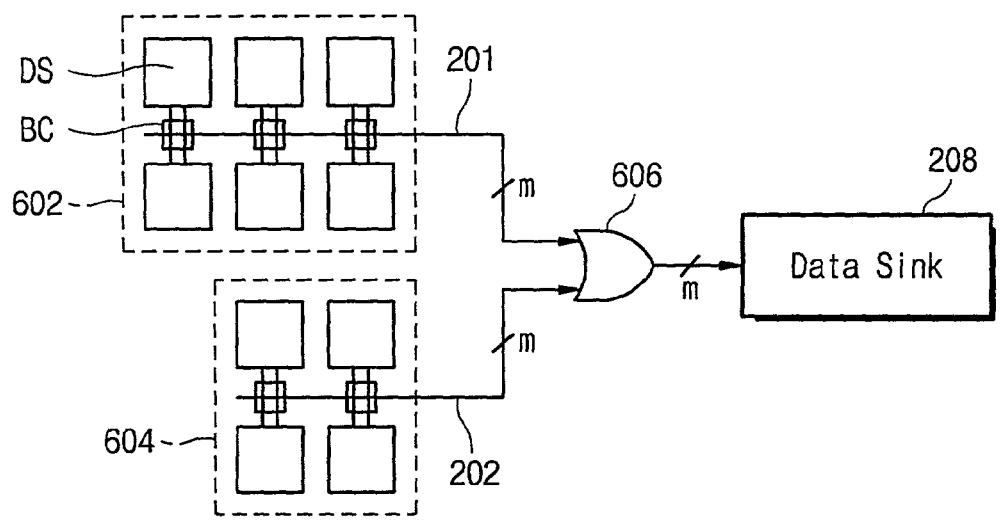
FIG. 6 depicts a distributed bus system according to a third embodiment of the invention.

FIG. 6 shows a third embodiment of a distributed bus system according to the instant invention. The structure shown in FIG. 6 is to reduce even more delay time as compared to the first and second embodiments aforementioned. By arranging plural block chains (e.g., 602 and 604) of bus cells, delay time may be reduced. The block chains 602 and 604 are each connected to their corresponding buses 200 and 201 through bus cells (BCs). The number of the block chains may vary according to conditions such as delay time(s) so that appropriate bus architecture may be constructed for an embedded system.

As shown in FIG. 6, each block chain may be constructed in the form of that shown in FIG. 4, i.e., one bus cell BC being assigned to two data sources (DSs). An OR gate 606 is disposed between the block chains, 602 and 604, and the data sink 208 to transfer a valid data bit to the data sink 208. The data bit output from the OR gate 606 is one provided from a selected data source and transferred through the bus cells including one that is interconnected to the selected data source, in one of the block chains 602 or 604. The OR gate 606 can be arranged for each data bit. The maximum value of delay time in the bus system shown in FIG. 6 is a sum of a delay time through the block chain and a delay time at the OR gate 606, approximately being one half of that of the second embodiment shown in FIG. 4.

As stated above, the invention offers useful techniques to reduce the number of interconnections from M*N to M, smaller than that with centralized single MUX-based buses and the same as that of the tri-state buses. Such a decrease in the interconnections is advantageous to shorten signal delay times due to mutual interferences and reduce power consumption on a chip. Further, signal propagation speed is faster. In the instant invention, a bus transfers signals in one direction, while the transmission of signals using tri-state buses is bi-directional, thus the signals pass through loads over all the elements of the bus in all directions. Therefore, the smaller load in transferring signals of the instant invention causes lower power consumption. Third, operational timing may be optimally controlled in a bus system of the invention. Since there are differences in delay times between the data sources in accordance with their locations or connecting positions in a bus or among buses, in the condition of the unidirectional signal transmission, data sources with smaller delay times can be placed at positions more adjacent to data sinks corresponding thereto. Forth, the instant invention does not need additional buffers because the OR gate associated with the bus also performs the function carried out by the conventional buffers to reduce delays through interconnections on buses.

It should be noted that the instant invention contemplates large scale embedded integration circuit layout, the number M or N may be large integers in the scale of tens to thousands and more. However, M or N may be smaller numbers as well.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A bus system including a plurality of data sources having a plurality of data bits, a common data transmission path coupling the plurality of data sources with a data sink, the bus system comprising:
   M interconnections, wherein M is a positive integer greater than or equal to 2; and
   N bus cells, wherein N is a positive integer greater than or equal to 2, coupling the data sources and the interconnections;
   wherein each of the bus cells is connected to a corresponding one of the data sources and includes a logic circuit to selectively provide data bits from the data sources to the interconnections,
   wherein each of the bus cells includes a bit connection circuit to selectively transfer the data bits to the interconnections, and each of the bit connection circuits comprises:
   an AND gate, having a first input and a second input, the first input comprising one of the data bits, the second input comprising a selection signal for selecting one of the data sources, the AND gate generating a logical output in response to the one of the data bits and the selection signal that selects one of the data sources; and
   an OR gate for generating a logical output in response to the output of the AND gate and a prior-stage output, the output from the OR gate being an output of the bus cell corresponding to the selected one of the data sources.

2. The bus system of claim 1, wherein a data source having a smaller delay or load than another data source is connected to one of the bus cells which is closer to the data sink.

3. A bus system including a plurality of data sources having a plurality of data bits, a common data transmission path coupling the plurality of data sources with a data sink, the bus system comprising:
   M interconnections, wherein M is a positive integer greater than or equal to 2; and
   N bus cells, wherein N is a positive integer greater and equal than 2, coupling the data sources and the interconnections;
   wherein each of the bus cells is coupled to a plurality of data sources and includes a logic circuit to selectively provide the data bits from the data sources to the interconnections,
   wherein the bus cells includes bit connection circuits in number of M or less to selectively transfer the data bits to the interconnections, and each of the bit connection circuits comprises:
   AND gates, each having a first input and a second input, the first input comprising one of the data bits, the second input comprising a selection signal for selecting one of the data sources, the AND gates generating logical outputs in response to the data bits and selection signals that select the data sources; and
   an OR gate for generating a logical output in response to the outputs of the AND gates and a prior-stage output, the output from the OR gate being an output of the bus cell corresponding to a selected one of the data sources.

4. The bus system of claim 3, wherein one of the data sources having a smaller delay or load than another data source is connected to one of the bus cells which is closer to the data sink.

5. A bus system including a plurality of data sources having a plurality of data bits, a common data transmission path coupling the plurality of data sources with a data sink, the bus system comprising:
   M interconnections, wherein M is a positive integer greater than or equal to 2; and
   N/2 bus cells, wherein N is an even positive integer greater than or equal to 4, coupling the data sources and the interconnections;
   wherein each of the bus cells is connected to a couple of the data sources and includes a logic circuit to selectively provide the data bits from the data sources to the interconnections,
   wherein the bus cells include bit connection circuits in number of M or less to selectively transfer the data bits to the interconnections, and each of the bit connection circuits comprises:
   a first AND gate having a first input and a second input, the first input comprising one of the data bits, the second input comprising a selection signal for selecting one of the data sources, the AND gate generating a logical output in response to a first set of data bits and a first selection signal that select one of the data sources;
   a second AND gate having a first input and a second input, the first input comprising one of the data bits, the second input comprising a selection signal for selecting one of the data sources, the AND gate generating a logical output in response to a second set of data bits and a second selection signal that select another one of the data sources; and
   an OR gate for generating a logical output in response to the outputs of the AND gates and a prior-stage output, the output from the OR gate being an output of the bus cell corresponding to the selected data sources.

6. The bus system of claim 5, wherein one of the data sources have a smaller delay or load than another data source is connected to one of the bus cells which is closer to the data sink.

7. A bus system including a plurality of data sources having a plurality of data bits, a common data transmission path coupling the plurality of data sources with a data sink, the bus system comprising:
   a plurality of groups of M interconnections, wherein M is a positive integer greater and equal than 2; and
   N/2 bus cells, wherein N is an even positive integer greater and equal than 4, being connected between the data sources and one of the groups;
   wherein each of the bus cells is connected to a corresponding one of the data sources and includes a logic circuit to selectively provide each of the data bits from the data sources to one of the interconnections,
   wherein the bus cells includes bit connection circuits in number of the M or less, selectively transferring the data bits to the interconnections, and each of the bit connection circuits comprises:
   AND gates, in numbers of the M or less, each having a first input and a second input, the first input comprising one of the data bits, the second input comprising a selection signal for selecting one of the data sources, the AND gate generating logical outputs in response to the data bits and selection signals that select the data sources; and
   an OR gate for generating a logical output in response to the outputs of the AND gates and a prior-stage output, the output from the OR gate being an output of the bus cell corresponding to a selected one of the data sources.

8. The bus system of claim 7, wherein one of the data sources having a smaller delay or load than another data source is connected to one of the bus cells which is closer to the data sink.

* * * * *